May 24, 1966  A. J. BRUNO, JR  3,252,764
APPARATUS FOR PRODUCING A FERTILIZER SLURRY
Filed Dec. 13, 1963
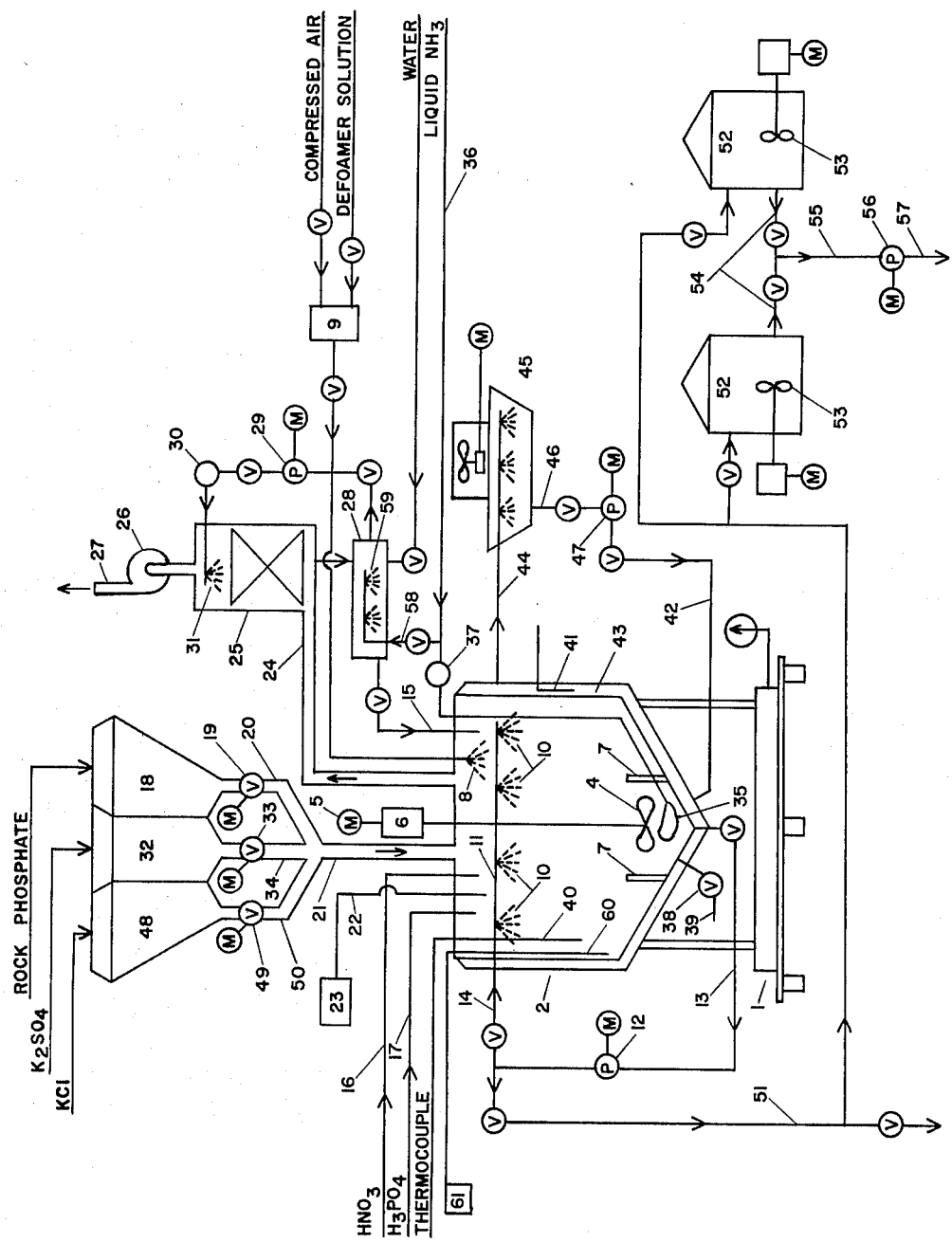
ANTHONY J. BRUNO, JR.—INVENTOR
BY Kenneth E. Prince
ATTORNEY

United States Patent Office 3,252,764
Patented May 24, 1966

3,252,764
APPARATUS FOR PRODUCING A
FERTILIZER SLURRY
Anthony J. Bruno, Jr., New Canaan, Conn., assignor to
W. R. Grace & Co., New York, N.Y., a corporation of
Connecticut
Filed Dec. 13, 1963, Ser. No. 330,380
3 Claims. (Cl. 23—259.2)

This invention relates to a new combination of apparatus. In one specific aspect it relates to a combination of apparatus for the production of fertilizer.

In summary, this invention is directed to apparatus for making slurry fertilizer comprising in combination; a water jacketed reactor, mounted on a weighing scale, and having its inner shell, or walls, and internal parts constructed of acid-resistant material; an agitator mounted within said reactor and equipped with driving means and a variable speed transmission; baffles positioned within said reactor; a plurality of small nozzles positioned within and near the top of said reactor adapted to dispense defoamer solution into said reactor from a defoamer tank positioned outside said reactor; a wash down system positioned within and near the top of said reactor comprising a plurality of nozzles in communication with a header adapted to receive the reaction mixture via a take off line, pump, and delivery line to wash down the interior walls of said reactor; three liquid feed lines, adapted to add water, nitric acid solution, and phosphoric acid solution, also communicating with said reactor; three hoppers, adapted to hold solid feed material, each communicating with a corresponding feed channel, provided with a control valve, said feed channels communicating with a main channel which communicates with said reactor; an exhaust channel, constructed of acid resistant material; a perforated sparger ring, adapted to add ammonia to said reactor, positioned within said reactor immediately below said agitator, said ring being constructed of acid-resistant material; said ring communicating with an ammonia feed line, the portion thereof which extends into said reactor being constructed of acid-resistant material; said line communicating with an ammonia flow regulator and thence with an ammonia source; said reactor being provided with a sampling valve and sampling line communicating with the bottom portion of said reactor; said reactor also being provided with thermocouples extending into said reactor; said thermocouples being protected by shields of acid-resistant material; a line communicating with the bottom portion of the space between the internal and external walls of said reactor and also communicating with a cooling water source; a line communicating with the upper portion of the space between the internal and external walls of said reactor and also communicating with a sewer line; a product recovery line communicating with the lowest point of said reactor, and the other end of said line communicating, through a slurry pump, to product storage tanks; and said tanks communicating, via a slurry pump and line, to a product loading dock.

The drawing is a flowsheet showing the arrangement of the apparatus of this invention.

It is an object of this invention to provide a combination of apparatus for the production of fertilizer slurries suitable for direct application to the soil. It is another object of this invention to provide a combination of apparatus for producing slurry fertilizers having the plant nutrients N, $P_2O_5$, and $K_2O$ available in the following weight ratios (expressed as $N:P_2O_5:K_2O$; 9:9:9; 7:14:7; 17:14:14; and 7:14:0. Still other objects will be apparent to those skilled in the art.

Referring to the drawing, the apparatus of this invention, in a preferred embodiment, comprises in combination the following elements and/or features; (a) a weighing scale 1 upon which is mounted; (b) a water jacketed reactor 2 with its inner shell, or walls, 3 constructed of stainless steel (suitable type 316) or other acid-resistant material; (c) mounted within said reactor, near the bottom of said reactor, is an agitator 4 (preferably a turbine type agitator, but a propeller type can be used) equipped with driving means 5 (which can be, for example, an electric motor or steam driven motor) and a variable speed transmission; (d) baffles 7 positioned within said reactor; (e) a plurality of small nozzles (one of which is shown at 8), which dispense defoamer solution into reactor 2 from tank 9, positioned near the top of reactor 2; (f) also positioned near the top of reactor 2 is a washed down system comprising a plurality of nozzles 10 in communication with header 11 to which the reaction mixture or product (slurry fertilizer) is circulated, via slurry pump 12 and lines 13 and 14, to wash down the interior walls of reactor 2 so that substantially no solid material is retained on said walls; (g) water is fed into the reactor via line 15; (h) nitric acid solution (e.g., ca. 40–60% by weight) enters the reactor via line 16; (i) if desired, phosphoric acid solution (e.g., ca. 45–65% by weight) can be fed into the reactor via line 17; (j) rock phosphate is fed into reactor 2 from hopper 18 via control valve 19 feed channel 20 and main channel 21; (k) since foaming occurs, electronic probe 22 activates foam height warning device 23 (e.g., a bell, flashing light, or similar alarm) which warns the operator if the foam height reaches a position requiring the application of an unusual quantity of defoamer; (l) fumes from the reaction between the acid and the phosphate rock leave reactor 2 via exhaust channel 24, scrubbing tower 25 (which can be packed with lumps, ca. 1–3 inches in diameter, of limestone, coke, or the like), exhaust blower 25, and stack 26; (m) ammonia is added to water in tank 28 via line 58 and nozzles 59, and said water is circulated (via a conventional pump 29, flow regulator 30, and spray nozzles 31) through scrubbing tower 25, thereby providing an alkaline medium for removing acidic gases (especially oxides of nitrogen) from the fumes leaving reactor 2; (n) potassium sulfate can be added to reactor 2 from hopper 32 via control valve 33 and channels 34 and 21; (o) ammonia is introduced into reactor 2 via perforated sparger ring 35 located immediately below agitator 4 (ammonia is fed to said sparger ring via line 36, and the rate of flow is controlled by ammonia flow regulator 37); (p) as ammoniation proceeds samples are taken via sampling valve 38 and sampling line 39, and the addition of ammonia is discontinued when the pH of the mixture is about 6.5–7.5 (alternatively, the electrodes 60 of a pH meter 61 can be positioned in the lower portion of reactor 2 where said electrodes will be in contact with the reactants therein); (q) since the temperature of the reaction mixture increases during ammoniation, thermocouples (e.g., those shown at 40 and 41) are used to measure said temperature, and cooling water from line 42 flows through cooling space 43 (the space between the inner and outer walls, or shells, of reactor 2) and thence via line 44 to a cooling tower 45 of conventional design from which said water is recycled to line 42 via line 46 and pump 47 (alternatively, water leaving cooling space 43 can be discarded and fresh water, e.g., from a well, river, or other source, can be fed into the system through line 42, thereby eliminating cooling tower 45; and permitting line 44 to drain into a sewer); (r) potassium chloride can be added to reactor 2 from hopper 48 via control valve 49 and channels 50 and 21; (s) the thus formed batch of slurry fertilizer is transferred via line 13, slurry pump 12 and line 51 to one or more product storage tanks 52 (alternatively the slurry from reactor 2 may be fed into tank trucks or tank cars via line 57 at a product loading dock); (t) the slurry storage tanks 52 are equipped with mechanically driven (or electrically driven) agitators 53 which prevent the solid components of the slurry fertilizer from separating; and (u) slurry from tanks 52 may be fed through lines 54 and 55, slurry pump 56, and line 57 to tank trucks or tank cars at a product loading dock.

The inside, or internals, of reactor 2, including all of the apparatus (e.g., agitator, agitator shaft, baffles, ammonia line, ammonia sparger ring, and the like) positioned therein and which contact acid, acidic slurry, or acidic fumes must be constructed of acid-resistant materials. As used herein, the term "acid-resistant material" means a material that is not substantially corroded or attacked by; (a) nitric acid up to about 60% $HNO_3$ by weight at ambient temperature; (b) mixtures of nitric acid and phosphoric acid up to about 40% $HNO_3$ by weight and up to about 30% $H_3PO_4$ by weight at ambient temperature; (c) nitric acid up to about 10% $HNO_3$ by weight at temperatures up to about 95° C.; (d) mixtures of nitric and phosphoric acid up to about 8% $HNO_3$ by weight and up to about 5% $H_3PO_4$ by weight at temperatures up to about 95° C.; nor, (e) at temperatures up to about 95° C., by the fumes evolved when nitric acid up to about 60% $HNO_3$ by weight (or mixtures of nitric acid and phosphoric acid up to about 40% $HNO_3$ by weight and up to about 30% $H_3PO_4$ by weight) react with rock phosphate. Suitable acid-resistant materials of construction include the various acid resistant stainless steels (especially type 316 stainless steel), nickel, tantalum, titanium, ceramic materials (including ceramic coatings), Teflon coatings, and the like. Obviously, the nitric and phosphoric acid lines, pumps, and valves (as well as acid storage tanks) must be made of acid-resistant materials. In the case of phosphoric acid tanks and lines, fiber glass reinforced polyester plastic is also an excellent material of construction. In addition, it is necessary to construct the fume exhaust channel and scrubbing tower, including lines and spray nozzles therein, of an acid-resistant material; however fiber glass reinforced polyester plastic is not suited for this use. It is not necessary to construct the exhaust blower and exhaust stack of an acid-resistant material (although said material can be used if desired); carbon steel has proved a satisfactory material for constructing these devices.

Aside from the reactor's internals, the exhaust channel, and the scrubbing tower and its internals, carbon steel can be used for constructing all metal parts of the combination of apparatus of this invention. Obviously, corrosion resistant metals, or alloys, can also be used, but they offer no advantage, and said metals and alloys are considerably more expensive than carbon steel.

Although the drawing shows the rock phosphate, $K_2SO_4$, and KCl hoppers (18, 32, and 48 respectively) communicating with respective feed channels 20, 34, and 50 which communicate with main channel 21 which, in turn, communicates with reactor 2, it is possible to dispense with channel 21 thereby permitting feed channels 20, 34, and 50 to communicate directly with reactor 2. Control valves 19, 33, and 49 can be operated mechanically, as shown in the drawing, or manually.

What is claimed is:

1. Apparatus for making slurry fertilizer comprising in combination; a water jacketed reactor, mounted on a weighing scale, and having its inner shell and internal parts constructed of acid-resistant material; an agitator mounted within said reactor and equipped with driving means and a variable speed transmission; baffles positioned within said reactor; a plurality of small nozzles positioned within and near the top of said reactor adapted to dispense defoamer solution into said reactor from a defoamer tank positioned outside said reactor; a wash down system positioned within and near the top of said reactor comprising a plurality of nozzles in communication with a header adapted to receive the reaction mixture via a take off line, pump, and deliver line to wash down the interior walls of said reactor; three liquid feed lines, adapted to add water, nitric acid solution, and phosphoric acid solution, also communicating with said reactor; three hoppers, adapted to hold solid feed material, each communicating with a corresponding feed channel, provided with a control valve, said feed channels communicating with a main channel which communicates with said reactor; an exhaust channel, constructed of acid resistant material; a perforated sparger ring, adapted to add ammonia to said reactor, positioned within said reactor immediately below said agitator, said ring being constructed of acid-resistant material; said ring communicating with an ammonia feed line, the portion thereof which extends into said reactor being constructed of acid-resistant material; said line communicating with an ammonia flow regulator and thence with an ammonia source; said reactor being provided with a sampling valve and sampling line communicating with the bottom portion of said reactor; said reactor also being provided with thermocouples extending into said reactor, said thermocouples being protected by shields of acid-resistant material; a line communicating with the bottom portion of the space between the internal and external walls of said reactor and also communicating with a cooling water source; a line communicating with the upper portion of the space between the internal and external walls of said reactor and also communicating with a sewer line; a product recovery line communicating with the lowest point of said reactor, and the other end of said line communicating, through a slurry pump, to product storage tanks; and said tanks communicating, via a slurry pump and line, to a product loading dock.

2. Apparatus for making slurry fertilizer comprising in combination; a water jacketed reactor, mounted on a weighing scale, and having its inner shell and internal parts constructed of acid-resistant material; an agitator mounted within said reactor and equipped with driving means and a variable speed transmission; baffles positioned within said reactor; a plurality of small nozzles positioned within and near the top of said reactor adapted to dispense defoamer solution into said reactor from a defoamer tank positioned outside said reactor; a wash down system positioned within and near the top of said reactor comprising a plurality of nozzles in communication with a header adapted to receive the reaction mixture via a take off line, pump, and delivery line to wash down the interior walls of said reactor; three liquid feed lines, adapted to add water, nitric acid solution, and phosphoric acid solution, also communicating with said reactor; three hoppers, adapted to hold solid feed material, each communicating with a corresponding feed channel, provided with a control valve, said feed channels communicating with a main channel which communicates with said reactor; said reactor being provided with an electronic probe protected by a shield of acid-resistant material and adapted to activate a warning device if the foam height within said reactor reaches a predetermined height; an exhaust channel, constructed of acid-resistant material, one end communicating with the top of said reactor and the other end of said channel communicating with a scrubbing tower, constructed of acid-resistant material, communicating with a stack via an exhaust blower; said tower being provided with spray nozzles, constructed of acid-resistant material, located in the top of said tower and with an exit line located in the bottom of said tower; said exit line communicating with a tank adapted to receive water and ammonia therein, said tank communicating with said spray nozzles via a line equipped with a pump and flow regulator and with said reactor via a line; a perforated sparger ring, adapted to add ammonia to said reactor, positioned within said reactor immediately below said agitator, said ring being constructed of acid-resistant material; said ring communicating with an ammonia feed line, the portion thereof which extends into said reactor being constructed of acid-resistant material; said line communicating with an ammonia flow regulator and thence with an ammonia source; said reactor being provided with a sampling valve and sampling line communicating with the bottom portion of said reactor; said reactor also being provided with first thermocouples extending into said reactor and with second thermocouples extending into the space between the internal and external walls of said reactor; said first thermocouples being protected by shields of acid-resistant material; a line communicating with the bottom portion of the space between the internal and external walls of said reactor and communicating with a cooling water source; the upper portion of said space communicating via a line with a sewer; a product recovery line communicating with the lowest point of said reactor, and the other end of said line communicating, through a slurry pump, to product storage tanks; said tanks communicating, via a slurry pump and line, to a product loading dock.

3. Apparatus for making slurry fertilizer comprising in combination: a water jacketed reactor, mounted on a weighing scale, and having its inner shell and internal parts constructed of acid-resistant material; an agitator mounted within said reactor and equipped with driving means and a variable speed transmission; baffles positioned within said reactor; a plurality of small nozzles positioned within and near the top of said reactor adapted to dispense defoamer solution into said reactor from a defoamer tank positioned outside said reactor; a wash down system positioned within and near the top of said reactor comprising a plurality of nozzles in communication with a header adapted to receive the reaction mixture via a take off line, pump, and delivery line to wash down the interior walls of said reactor; three liquid feed lines, adapted to add water, nitric acid solution, and phosphoric acid solution, also communicating with said reactor; three hoppers, adapted to hold solid feed material, each communicating with a corresponding feed channel, provided with a control valve, said feed channels communicating with a main channel which communicates with said reactor; said reactor being provided with an electronic probe protected by a shield of acid-resistant material and adapted to activate a warning device if the foam height within said reactor reaches a predetermined height; an exhaust channel, constructed of acid-resistant material, one end communicating with the top of said reactor and the other end of said channel communicating with a scrubbing tower, constructed of acid-resistant material, communicating with a stack via an exhaust blower; said tower being provided with spray nozzles, constructed of acid-resistant material, located in the top of said tower and with an exit line located in the bottom of said tower; said exit line communicating with a tank adapted to receive water and ammonia therein, said tank communicating with said spray nozzles via a line equipped with a pump and flow regulator and with said reactor via a line; a perforated sparger ring, adapted to add ammonia to said reactor, positioned within said reactor immediately below said agitator, said ring being constructed of acid-resistant material; said ring communicating with an ammonia feed line, the portion thereof which extends into said reactor being constructed of acid-resistant material; said line communicating with an ammonia flow regulator and thence with an ammonia source; said reactor being provided with a sampling valve and sampling line communicating with the bottom portion of said reactor; said reactor being provided with pH electrodes located within the lower portion of said reactor and adapted to indicate the pH of slurry within said reactor; said reactor also being provided with first thermocouples extending into said reactor and with second thermocouples extending into the space between the internal and external walls of said reactor; said first thermocouples being protected by shields of acid-resistant material; a line communicating with the upper portion of the space between the internal and external walls of said reactor and also communicating with the upper portion of a conventional cooling tower; the bottom portion of said tower communicating via a pump and line with said space between said reactor's walls near the bottom portion of said space; a product recovery line communicating with the lowest point of said reactor, and the other end of said line communicating, through a slurry pump, to product storage tanks; said tanks communicating, via a slurry pump and line, to a product loading dock.

No references cited.

MORRIS O. WOLK, *Primary Examiner.*

J. H. TAYMAN, *Assistant Examiner.*